(12) United States Patent
Saitou et al.

(10) Patent No.: US 11,987,714 B2
(45) Date of Patent: May 21, 2024

(54) COPPER PHTHALOCYANINE PIGMENT COMPOSITION AND INK COMPOSITION CONTAINING SAME

(71) Applicant: DIC Corporation, Tokyo (JP)

(72) Inventors: Shingo Saitou, Kamisu (JP); Taichi Hashiguchi, Kamisu (JP)

(73) Assignee: DIC CORPORATION, Tokyo (JP)

(*) Notice: Subject to any disclaimer, the term of this patent is extended or adjusted under 35 U.S.C. 154(b) by 824 days.

(21) Appl. No.: 17/253,844

(22) PCT Filed: Jun. 13, 2019

(86) PCT No.: PCT/JP2019/023443
§ 371 (c)(1),
(2) Date: Dec. 18, 2020

(87) PCT Pub. No.: WO2020/017197
PCT Pub. Date: Jan. 23, 2020

(65) Prior Publication Data
US 2021/0261801 A1 Aug. 26, 2021

(30) Foreign Application Priority Data

Jul. 18, 2018 (JP) .................................. 2018-135039

(51) Int. Cl.
*C09D 11/037* (2014.01)
*C09B 67/20* (2006.01)
(Continued)

(52) U.S. Cl.
CPC ........ *C09D 11/037* (2013.01); *C09B 67/0067* (2013.01); *C09B 67/009* (2013.01); *C09D 11/033* (2013.01); *C09D 11/08* (2013.01)

(58) Field of Classification Search
CPC ..... C09D 11/037; C09D 11/033; C09D 11/08; C09B 67/0067; C09B 67/009; C09B 67/0013; C09B 67/0026
See application file for complete search history.

(56) References Cited

U.S. PATENT DOCUMENTS

| | | | |
|---|---|---|---|
| 2005/0215780 A1* | 9/2005 | Shiromaru | C09B 67/0016 106/410 |
| 2009/0293769 A1* | 12/2009 | Lee | G03F 7/0007 106/411 |
| 2011/0045257 A1* | 2/2011 | Arai | C09D 139/06 524/548 |

FOREIGN PATENT DOCUMENTS

| | | |
|---|---|---|
| EP | 0 638 615 A2 | 2/1995 |
| JP | 7-53889 A | 2/1995 |

(Continued)

OTHER PUBLICATIONS

"Solsperse 5000." National Center for Biotechnology Information. PubChem Compound Database, U.S. National Library of Medicine, pubchem.ncbi.nlm.nih.gov/compound/138394525. Accessed Jan. 12, 2024. (Year: 2024).*

(Continued)

*Primary Examiner* — Jennifer A Smith
*Assistant Examiner* — Jeffrey Eugene Barzach
(74) *Attorney, Agent, or Firm* — WHDA, LLP (57) ABSTRACT

A usual ink composition can be expected to improve ink viscosity to a certain degree, but when used for a glycol ether-based ink recently required, an increase in viscosity in preparing the ink cannot be suppressed. In addition, there is unknown a copper phthalocyanine pigment composition which can satisfy both such an improvement in ink viscosity and resolubility as printability which is important for the glycol ether-based ink. In this situation, a problem to be solved by the present invention is to provide a copper (Continued)

phthalocyanine pigment composition having low viscosity and excellent resolubility in a glycol ether-based ink. It was found that when a copper phthalocyanine pigment is combined with a specified copper phthalocyanine acid derivative, a pigment composition having significantly low viscosity when formed into a glycol ether-based ink, and good familiarity with the ink can be produced, leading to the achievement of the present invention.

2 Claims, 2 Drawing Sheets

(51) Int. Cl.
*C09B 67/46* (2006.01)
*C09D 11/033* (2014.01)
*C09D 11/08* (2006.01)

(56) References Cited

FOREIGN PATENT DOCUMENTS

| | | | | |
|---|---|---|---|---|
| JP | 2011148910 A | * | 8/2011 | |
| WO | WO-2011078502 A2 | * | 6/2011 | ............. C09B 19/02 |

OTHER PUBLICATIONS

English machine translation of WO-2011078502-A2 (Year: 2011).*
English machine translation of JP-2011148910-A (Year: 2011).*
International Search Report dated Aug. 27, 2019, issued in counterpart International Application No. PCT/JP2019/023443 (2 pages).

* cited by examiner

COPPER PHTHALOCYANINE PIGMENT COMPOSITION AND INK COMPOSITION CONTAINING SAME

TECHNICAL FIELD

The present invention relates to a copper phthalocyanine pigment composition which can be used for a wide range of applications such as a printing ink, a coating material, a colored molded article, textile printing, etc.

BACKGROUND ART

In general, pigments for the purpose of coloring are composed of fine particles. For example, when a pigment composed of an aggregate of fine primary particles is dispersed in a medium as in the case of a printing ink for gravure printing, flexographic printing, and the like, and a coating material, an attempt is made to disperse the particles by applying strong force for a long time or by adding a dispersant for disaggregating the particles.

In particular, a copper phthalocyanine pigment is a pigment used in various scenes, but has a remarked problem with fluidity when used as a coloring agent for various applications. Further, there has recently been demand for an ink having a low environmental load in general-purpose printing and being capable of improving leveling properties for printed matter surfaces. In order to achieve this, attention is brought to an ink with a low drying rate, composed of glycol ether as a main component (referred to as a "glycol ether-based ink" hereinafter). The glycol ether-based ink has lower volatility than a usual alcohol-based ink and is thus expected to improve the leveling properties (increase definition) for printed matter surfaces associated with decreases in drying rate. However, there are not yet many findings about the ink characteristics and printability of the glycol ether-based ink. The ink characteristics of the glycol ether-based ink include viscosity, and the printability includes resolubility.

In order to improve the ink characteristics of a copper phthalocyanine pigment composition, for example, Patent Literature 1 discloses a method of treating a copper phthalocyanine sulfonic acid ammonium salt (primary to quaternary) in applications to a printing ink and a coating material.

CITATION LIST

Patent Literature

PTL 1: Japanese Unexamined Patent Application Publication No. 7-53889

SUMMARY OF INVENTION

Technical Problem

However, the method described in Patent Literature 1 can be expected to improve to a certain degree the ink viscosity in a usual ink composition, but when used for a glycol ether-based ink which has been recently required, an increase in viscosity in preparing the ink cannot be suppressed. In addition, there is unknown a copper phthalocyanine pigment composition which can satisfy both such an improvement in ink viscosity and resolubility as printability important for the glycol ether-based ink.

In this situation, a problem to be solved by the present invention is to provide a copper phthalocyanine pigment composition having low viscosity and excellent resolubility in a glycol ether-based ink.

Solution to Problem

As a result of keen research for solving the problem, the inventors found that the combination of a copper phthalocyanine pigment with a specified copper phthalocyanine acid derivative can produce a pigment composition having significantly low viscosity when formed into a glycol ether-based ink and having good familiarity with the ink, leading to the achievement of the present invention.

That is, the present invention relates to the following:
"Item 1. A copper phthalocyanine pigment composition containing:
  a copper phthalocyanine pigment;
  a copper phthalocyanine sulfonic acid derivative represented by general formula (I),

[Chem. 1]

General Formula (I)

[in the formula, n represents an average number of substituents of 0.5 to 1.5];
a copper phthalocyanine derivative represented by general formula (II),

[Chem. 2]

General Formula (II)

[in the formula, $R^1$ represents a $C_1$-$C_{20}$ alkyl group, and n represents an average number of substituents of 0.5 to 1.5]; and a copper phthalocyanine derivative represented by general formula (III),

[Chem. 3]

General Formula (II)

[in the formula, $R^2$, $R^3$, $R^4$, and $R^5$ each independently represent a $C_1$-$C_{20}$ alkyl group, at least one of $R^2$, $R^3$, $R^4$, and $R^5$ is a $C_6$-$C_{2G}$ alkyl group, and n represents an average number of substituents of 0.5 to 1.5].

Item 2. The copper phthalocyanine pigment composition described in Item 1, wherein the content of the copper phthalocyanine sulfonic acid derivative represented by the general formula (I) described in Item 1 is 2% by mass or more and 4% by mass or less, the content of the copper phthalocyanine derivative represented by the general formula (II) described in Item 1 is 5% by mass or more and 6% by mass or less, and the content of the copper phthalocyanine derivative represented by the general formula (III) described in Item 1 is 0.5% by mass or more and 5% by mass or less.

Item 3. An ink composition containing at least the copper phthalocyanine pigment composition described in any one of Items 1 and 2, a nitrocellulose resin, and a glycol ether-based solvent."

Advantageous Effects of Invention

According to the present invention, it is possible to provide a copper phthalocyanine pigment composition having low viscosity and excellent resolubility in a glycol ether-based ink.

DESCRIPTION OF EMBODIMENTS

The present invention described in detail below.

The present invention relates to a copper phthalocyanine pigment composition containing a copper phthalocyanine pigment, a copper phthalocyanine sulfonic acid derivative represented by general formula (I), a copper phthalocyanine derivative represented by general formula (II), and a copper phthalocyanine derivative represented by general formula (III).

The pigment composition of the present invention shows excellent fluidity even when used as a printing ink and a coating material. Further, the pigment composition of the present invention has low viscosity and excellent resolubility in a glycol ether-based ink which has been recently required.

In the present invention, the term "low viscosity" represents the low initial viscosity particularly when an ink is prepared.

In the present invention, the term "resolubility" represents solubility in a solvent constituting an ink after the pigment composition in the ink once becomes a dry material. For example, "low resolubility" represents a state where the pigment composition is hardly redissolved in the solvent once it becomes a dry material.

In an actual printing machine, the ink remaining on a printing plate after transferred (printed) to media is relatively easily dried. Therefore, the ink is preferably redissolved in its own ink when returned to an ink bottle. However, it is known that with low resolubility, dry ink layers are laminated, thereby causing failure of transfer to media and a problem of printability, such as the occurrence of printing streaks. From this viewpoint, resolubility is considered as important printability.

<Description of Copper Phthalocyanine Pigment>

The copper phthalocyanine pigment used in the present invention is one produced by micronizing a copper phthalocyanine crude (β) by dry grinding and then converting to β-type crystal by solvent-pigment formation or is β-type copper phthalocyanine produced by heating and grinding a copper phthalocyanine crude (β) together with a solvent using an inorganic salt crystal. A commercial product (for example, FASTOGEN BLUE 5362K, FASTOGEN BLUE TGR, or the like manufactured by DIC Corporation) may be used as the copper phthalocyanine pigment used in the present invention, or a product of a well-known common method may be used. Also, if required, an α-type copper phthalocyanine pigment or a pigment with another structure may be contained for hue adjustment or the like within a range causing no adverse effect on performance. Of course, proper known treatment after production may be performed before use in the present invention.

The β-type copper phthalocyanine, which is surface-treated with a resin or surface-modified with a pigment derivative or a dispersant for the purpose of controlling pigment crystal and improving use applicability, may be used unless the performance is adversely affected.

<Description of Pigment Derivative>

In the present invention, as described above, the excellent effect described above can be obtained by using the copper phthalocyanine pigment in combination with the three pigment derivatives: the copper phthalocyanine sulfonic acid derivative represented by the general formula (I), the copper phthalocyanine derivative represented by the general formula (II), and the copper phthalocyanine derivative represented by the general formula (III).

Herein, the copper phthalocyanine sulfonic acid derivative represented by the general formula (I) is a mixture of copper phthalocyanine compounds having different numbers of sulfo group substituents. The average number of substituents n is 0.5 to 1.5 and is preferably 0.8 to 1.2. When the average number of substituents is less than 0.5, the satisfactory effect of decreasing viscosity in the glycol ether-based ink cannot be obtained. Also, when the average number of substituents exceeds 1.5, good resolubility cannot be obtained due to unsatisfactory familiarity with the ink.

The copper phthalocyanine skeleton functions as an adsorption site to the copper phthalocyanine pigment, while the sulfo group functions as an adsorption site to a nitrocellulose resin (may be referred to as a "NC resin" hereinafter) or the like. Therefore, the resin can be adsorbed on the surfaces of the pigment and the copper phthalocyanine sulfonic acid derivative represented by the general formula (I). Thus, the resin resistance in the ink solvent is decreased, and thus the effect of decreasing ink viscosity can be obtained.

In addition, the copper phthalocyanine derivative represented by the general formula (II) is a mixture of copper phthalocyanine compounds having different numbers of ammonium sulfonate group substituents. The average number of substituents n is 0.5 to 1.5 and is preferably 0.8 to 1.2. When the average number of substituents is less than 0.5, good resolubility cannot be obtained due to unsatisfactory familiarity with the glycol ether-based ink. When the average number of substituents exceeds 1.5, the ink viscosity is increased due to excessive familiarity with the ink.

The copper phthalocyanine skeleton functions as an adsorption site to the copper phthalocyanine pigment, while the ammonium sulfonate salt portion functions as a compatible group with an alcohol solvent used as a dilution solvent. Therefore, dispersibility of the pigment and the copper phthalocyanine derivative represented by the general formula (II) is improved, and thus formation of a resin film is moderately inhibited, thereby exhibiting good resolubility.

In addition, the copper phthalocyanine derivative represented by the general formula (III) is a mixture of copper phthalocyanine compounds having different numbers of quaternary ammonium sulfonate group substituents. The average number of substituents n is 0.5 to 1.5 and is preferably 0.8 to 1.2. When the average number of substituents is less than 0.5, good resolubility cannot be obtained due to unsatisfactory familiarity with the glycol ether-based ink. Also, when the average number of substituents exceeds 1.5, the ink viscosity is increased due to excessive familiarity with the ink.

The copper phthalocyanine skeleton functions as an adsorption site to the copper phthalocyanine pigment, while the quaternary ammonium sulfonate salt portion functions as a compatible group with a glycol ether-based solvent. Therefore, dispersibility of the pigment and the copper phthalocyanine derivative represented by the general formula (III) is improved, and thus formation of a resin film is moderately inhibited, thereby exhibiting good resolubility.

The glycol ether-based ink generally uses an alcohol solvent as a dilution solvent in addition to glycol ether as a main solvent, and thus has a very complicated system. In the present invention, it is supposed that very low viscosity and resolubility in the glycol ether-based ink are exhibited by the synergistic effect of the three specific derivatives having the effects described above.

Herein, examples of a "$C_1$-$C_{20}$ alkyl group" in the general formula include a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-icosyl group, and the like.

Examples of a "$C_5$-$C_{20}$ alkyl group" which can be used as at least one of $R^2$, $R^3$, $R^4$, and $R^5$ include a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-icosyl group, and the like.

In the present specification, "n-" represents "normal", and for example, a "n-propyl group" represents a "normal propyl group".

In order to further obtain the excellent effect of the present invention, $R^1$ is preferably a $C_6$-$C_{20}$ alkyl group and particularly preferably a $C_{10}$-$C_{15}$ alkyl group. In order to further obtain the excellent effect of the present invention, two of $R^2$, $R^3$, $R^4$, and $R^5$ are each preferably a $C_6$-$C_{20}$ alkyl group and particularly preferably a $C_{15}$-$C_{18}$ alkyl group. Examples of the "$C_6$-$C_{20}$ alkyl group", the "$C_{10}$-$C_{15}$ alkyl group", and the "$C_{15}$-$C_{18}$ alkyl group" include those described above.

When one to three Rs of $R^2$, $R^3$, $R^4$, and $R^5$ are each the "$C_6$-$C_{20}$ alkyl group", the remaining one to three Rs are each the "$C_1$-$C_{20}$ alkyl group", but from the viewpoint of further enhancing fluidity, the Rs are each preferably a "$C_1$-$C_3$ alkyl group".

Of course, even when all of $R^2$, $R^3$, $R^4$, and $R^5$ are each the "$C_6$-$C_{20}$ alkyl group", the effects of the present invention can be obtained.

The present invention is achieved based on the finding that the effect of the present invention can be obtained by trial-and-error using the three pigment derivatives among innumerable conceivable derivatives in combination with copper phthalocyanine.

The present invention has been found by trial-and-error, and thus the action mechanism is unclear, but the inventors made investigation from the following viewpoint.

When the pigment or the pigment derivative does not rapidly become familiar with the ink solvent, only the ink resin is preferentially strongly bonded to form a film in a drying process, thereby significantly decreasing resolubility in the ink solvent. Therefore, it is considered that the pigment or pigment derivatives can be uniformly dispersed between coating films by treatment with quaternary ammonium salt of copper phthalocyanine sulfonic acid, which is familiar with the glycol ether-based solvent, thereby causing moderate coating film strength which exhibits resolubility. This effect cannot be exhibited only by adding a derivative which has been investigated, such as a primary ammonium salt of copper phthalocyanine sulfonic acid or the like.

<Description of Mixing Amount>

The effect of the present invention can be more preferably obtained by using the copper phthalocyanine pigment composition containing:

2.0% by mass or more and 4.0% by mass or less of the copper phthalocyanine sulfonic acid derivative represented by the general formula (I), 5.0% by mass or more and 6.0% by mass or less of the copper phthalocyanine derivative represented by the general formula (II), and 0.5% by mass or more and 5.0% by mass or less of the copper phthalocyanine derivative represented by the general formula (III).

<Method for Producing Pigment Derivative>

Herein, a method for producing each of the pigment derivatives is described. Any method may be used. A commercial product or a product by a well-known common method can be used as the copper phthalocyanine sulfonic acid derivative represented by the general formula (I) serving as a raw material. A copper phthalocyanine sulfonic acid derivative (Solsperse 12000 manufactured by Lubrizol Corporation) can be used as a commercial product. With respect to a well-known common method, the copper phthalocyanine sulfonic acid derivative represented by the general formula (I) can be produced by, for example, sulfonating a copper phthalocyanine pigment with concentrated sulfuric acid or fuming sulfuric acid or sulfochlorinating the starting material with chlorosulfonic acid, followed by hydrolysis with water.

A desired derivative can be produced by mixing an amine or ammonium salt while maintaining it at the dissolution temperature or more in uniform or nonuniform water or organic solvent phase of the copper phthalocyanine sulfonic acid derivative. The pigment derivative represented by each of the general formula (II) and the general formula (III) can be produced by using 1 mole of amine or ammonium salt relative to 1 mole of sulfo group of the copper phthalocyanine sulfonic acid derivative.

Examples of a primary amine for forming the copper phthalocyanine derivative of the general formula (II) include methylamine, ethylamine, n-propylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-nonadecylamine, n-icosylamine, and the like. The structural isomers thereof or these amines having a double bond may be used.

Examples of a quaternary ammonium salt for forming the copper phthalocyanine derivative of the general formula (III) include dilauryldimethyl ammonium chloride, dimethyldistearyl ammonium chloride, dimethyldidecyl ammonium chloride, dimethyldidodecyl ammonium chloride, trimethylstearyl ammonium chloride, trimethyldodecyl ammonium chloride, trimethyloctadecyl ammonium chloride, dimethyldodecyltetradecyl ammonium chloride, dimethylhexadecyloctadecyl ammonium chloride, and the like.

An example of a method for simply producing the pigment composition of the present invention is described below, but the present invention should not be interpreted limitedly to this example.

<Method for Producing Pigment Composition>

A copper phthalocyanine crude used as a raw material is dry-ground to produce a crude copper phthalocyanine pigment. The crude copper phthalocyanine crude pigment and the copper phthalocyanine sulfonic acid of the general formula (I) are added to a solvent and stirred to prepare a pigment slurry. Then, the pigment slurry is separated from the solvent by heating and stirring in a solvent removing step, Then, a powdery pigment composition is obtained through a surface treatment step of adding a primary amine to the separated pigment slurry, stirring the mixture, and adjusting pH and a step of filtering the pigment slurry and drying and griding the residue. The intended pigment composition can be obtained through a step of mixing the powdery pigment composition with a powder of the copper phthalocyanine derivative of the general formula (III).

The intended pigment composition can also be produced by a method of adding a quaternary ammonium salt solution in the surface treatment step of the method described above or a method of adding the derivative of each of the general formula (II) and the general formula (III) in the surface treatment step. In this case, the derivative of each of the general formula (II) and the general formula (III) may be in the form of a slurry, a wet cake, or a powder.

Similarly, the intended pigment composition can also be produced by a method of mixing the dry copper phthalocyanine pigment with the derivative of each of the general formula (I), the general formula (II), and the general formula (III) or a method of adding the derivative of each of the general formula (I), the general formula (II), and the general formula (III) during kneader-grinding/pigment formation.

The pigment composition of the present invention can be adjusted to be suitable for each application by further containing an additive, a dispersant, etc. unless the effect of the present invention is adversely affected.

Also, the pigment composition of the present invention can be combined with an organic pigment other than the P-type copper phthalocyanine pigment as a coloring component.

The organic pigment which can be used can be properly selected from known organic pigments according to various applications and can be used.

The pigment composition of the present invention produced as described above can be preferably used for any application such that a coloring function is required. Usable examples of applications include well-known common applications such as a coating material, a printing ink, a colored molded article, a toner for electrostatic image development, a color filter of a liquid crystal display device, an aqueous ink for ink jet recording, and the like.

The pigment composition of the present invention can provide a printing ink also excellent in initial viscosity and storage stability. The printing ink can be prepared by mixing the pigment composition of the present invention with any of well-known common various binder resins, various solvents, various additives, etc. according to a usual preparation method. Specifically, a liquid ink can be prepared by preparing a base ink for a liquid ink with a high pigment concentration and using any of various binders, various solvents, various additives, etc.

The pigment composition of the present invention can produce a PU ink or NC ink having excellent initial viscosity and storage stability, and is suitable as an organic pigment composition for a gravure printing ink and a flexographic printing ink. The PU ink includes a PU resin, a pigment, a solvent, and various additives, and the NC ink includes a NC resin, a pigment, a solvent, and various additives. The PU resin is not particularly limited as long it has a urethane structure in its skeleton, and examples thereof include polyurethane, polyurethane/polyurea, and the like. Examples of the solvent include:

aromatic organic solvents such as toluene, xylene, and the like;

ketone solvents such as methyl ethyl ketone, methyl isobutyl ketone, cyclohexanone, 2-heptanone, 3-heptanone, and the like;

ester solvents such as ethyl acetate, n-propyl acetate, isopropyl acetate, isobutyl acetate, propylene glycol monoethyl ether acetate, propylene glycol monomethyl ether acetate, and the like;

alcohol solvents such as methanol, ethanol, n-propanol, isopropanol, n-butanol, isobutanol, tert-butanol, and the like; and glycol ether solvents such as ethylene glycol monomethyl ether, ethylene glycol monoethyl ether, ethylene glycol mono-n-propyl ether, ethylene glycol mono-i-propyl ether, ethylene glycol mono-n-butyl ether, ethylene glycol mono-i-butyl ether, ethylene glycol mono-tert-butyl ether, propylene glycol monomethyl ether, propylene glycol monoethyl ether, propylene glycol mono-n-propyl ether, propylene glycol mono-i-propyl ether, propylene glycol mono-n-butyl ether, propylene glycol mono-i-butyl ether, propylene glycol mono-tert-butyl ether, ethylene glycol dimethyl ether, ethylene glycol diethyl ether, ethylene glycol di-n-propyl ether, ethylene glycol di-i-propyl ether, ethylene glycol di-n-butyl ether, ethylene glycol di-i-butyl ether, ethylene glycol di-tert-butyl ether, propylene glycol dimethyl ether, propylene glycol diethyl ether, propylene glycol di-n-propyl ether, propylene glycol di-i-propyl ether, propylene glycol di-n-butyl ether, propylene glycol di-i-butyl ether, propylene glycol di-tert-butyl ether, diethylene glycol monomethyl ether, diethylene glycol monoethyl ether, diethylene glycol mono-n-propyl ether, diethylene glycol mono-i-propyl ether, diethylene glycol mono-n-butyl ether, diethylene glycol mono-i-butyl ether, diethylene glycol mono-tert-butyl ether, diethylene glycol dimethyl ether, diethylene glycol diethyl ether, diethylene glycol di-n-propyl ether, diethylene glycol di-i-propyl ether, diethylene glycol di-n-butyl ether, diethylene glycol di-i-butyl ether, diethylene glycol di-tert-butyl ether, dipropylene glycol monomethyl ether, dipropylene glycol monoethyl ether, dipropylene glycol mono-n-propyl ether, dipropylene glycol mono-i-propyl ether, dipropylene glycol mono-n-butyl ether, dipropylene glycol mono-i-butyl ether, dipropylene glycol mono-tert-butyl ether, dipropylene glycol dimethyl ether, dipropylene glycol diethyl ether, dipropylene glycol di-n-propyl ether, dipropylene glycol di-i-propyl ether, dipropylene glycol di-n-butyl ether, dipropylene glycol di-i-butyl ether, dipropylene glycol di-tert-butyl ether, ethylene glycol monomethyl ether acetate, ethylene glycol monoethyl ether acetate, diethylene glycol monomethyl ether acetate, diethylene glycol monoethyl ether acetate, and the like.

The pigment composition of the present invention exhibits excellent fluidity in an ink including any of the solvents, and detailed description is made below for deeply describing applicability to a glycol ether-based ink, which has recently been increasingly required in the market.

In recent years, there has been required an ink having a low environmental load in the general-purpose printing field and being capable of improving leveling properties for printed matter surfaces. In order to achieve this, attention is paid to an ink with a low drying rate, composed of a glycol ether-based solvent as a main component (referred to as a "glycol ether-based ink" hereinafter). The glycol ether-based ink has lower volatility than a usual alcohol-based ink and is thus expected to improve the leveling properties (increase definition) for printed matter surfaces associated with decreases in the drying rate. However, there have been yet few findings about the ink characteristics and printability of the glycol ether-based ink. In such circumstances, viscosity is found as an important ink characteristic of the glycol ether-based ink, but there is clarified the actual situation in which satisfactory fluidity cannot be considered to be secured even by using the same technique for improving fluidity of a phthalocyanine pigment as for a usual alcohol-based ink.

When mentioning from the viewpoint that the solvent constitutes the ink recently required as described above, an ink composition of the present invention preferably contains at least the pigment composition of the present invention and the glycol ether-based solvent.

In particular, the glycol ether-based solvent is preferably ethylene glycol monomethyl ether, ethylene glycol monoethyl ether, ethylene glycol monopropyl ether, propylene glycol monomethyl ether, propylene glycol monoethyl ether, or propylene glycol monopropyl ether, and is more preferably propylene glycol monoethyl ether.

The solvents may be used alone or in combination of two or more. Usable examples of various additives include anionic, nonionic, cationic, and amphoteric surfactants, and the like; rosins such as gum rosin, polymerized rosin, disproportionated rosin, hydrogenated rosin, maleinized rosin, cured rosin, phthalic acid alkyd resin, and the like; a pigment derivative, a dispersant, a wetting agent, an adhesion auxiliary agent, a leveling agent, a defoaming agent, an antistatic agent, a trapping agent, an anti-blocking agent, a wax component, and the like.

The pigment composition of the present invention exhibits excellent fluidity for an ink composed of any resin but is useful for nitrocellulose. Nitrocellulose is called "cellulose nitrate" and is a resin produced by nitrating hydroxyl groups of cellulose with a mixed acid of sulfuric acid and nitric acid. The solubility of nitrocellulose in a solvent depends on the degree of nitration, and nitrocellulose with a high degree of nitration is used for a hydrocarbon solvent and an ester solvent, while nitrocellulose with a low degree of nitration is used for an alcohol solvent. Nitrocellulose has a high glass transition point and causes little blocking during winding of a printed matter. Further, a nitrocellulose-based gravure ink has good printability, and thus nitrocellulose is widely used as a binder resin of a printing ink.

When the pigment composition of the present invention is used as a printing ink, a printing ink using the pigment composition of the present invention, which is prepared as described above, can be used by being diluted with ethyl acetate, polyurethane-based varnish, or polyamide-based varnish. The printing ink can be prepared by using a well-known common method.

When the pigment composition of the present invention is used as a coating material serving as a coloring agent, examples of the resin used for the coating material include various resins such as an acrylic resin, a melamine resin, an epoxy resin, a polyester resin, a polyurethane resin, a polyamide resin, a phenol resin, and the like.

Examples of a solvent suitably used for the coating material include an acetate ester-based solvent, a propionate-based solvent, an alcohol solvent, an ether solvent, a ketone solvent, an aliphatic hydrocarbon solvent, a nitrogen compound-based solvent, a lactone-based solvent, a carbamic acid ester such as a mixture of methyl carbamate and ethyl carbamate at 48:52, water, and the like. The solvent is particularly suitably a water-soluble polar solvent such as a propionate-based, alcohol, ether, ketone, nitrogen compound-based, or lactone-based solvent, water, or the like.

When the pigment composition is dispersed or mixed in a liquid resin and is used as a resin composition for a coating material, it is possible to use usual additives, for example, dispersants, fillers, coating auxiliary agents, drying agents, plasticizers, and/or auxiliary pigments. This can be achieved by adding these components singly or in combination of some or all components, or adding all components at a time, and then dispersing or mixing the resultant mixture.

Examples of a disperser for dispersing a composition containing the pigment composition prepared according to applications as described above include, but are not limited to, known dispersers such as Disper, a homo-mixer, a paint conditioner, Skandex, a beads mill, an attritor, a ball mill, a two-roll mill, a three-roll mill, a pressure kneader, and the like. In dispersing the pigment composition, the resin and the solvent are added and dispersed so as to have viscosity with which the composition can be dispersed by such a disperser. A high-concentration coating material base after dispersion has a solid content of 5% to 20%, and the base is further mixed with the resin and the solvent and then used as a coating material.

The present invention is described in further detail below by using examples and comparative examples. In the examples and comparative examples below, "%" represents "% by mass" unless otherwise specified.

Example 1

(First step) A copper phthalocyanine crude manufactured by DIC Corporation was dry-ground by an attritor to produce a copper phthalocyanine ground product.

(Second step) To 200.0 parts of the copper phthalocyanine ground product, 330.0 parts of a rosin solution and 450.0 parts of (1) copper phthalocyanine sulfonic acid solution were added. Then, 220.0 parts of water was added to the resultant mixture and heated to 93° C. After the completion of heating, 15 parts of xylene was immediately added and stirred at 93° C. for 3 hours. After the completion of stirring, 336.5 parts of (2) copper phthalocyanine sulfonic acid solution was added and further stirred at 93° C. for 1 hour. After the completion of stirring, xylene was distilled off by heating to 100° C. After distillation off, water was added until the total amount was 4000.0 parts, and the resultant solution was adjusted to PH 3.9 by dropping a 9% aqueous acetic acid solution over 30 minutes. Then, 500.0 parts of a laurylamine (primary ammonium (monoalkyl)) acetic acid solution was added to the solution and stirred for 1 hour. Then, 7.3 parts of a powder of quaternary dimethyl dialkyl (C=18) ammonium salt of copper phthalocyanine sulfonic acid was added to the resultant mixture and further stirred for 30 minutes. Then, the resultant mixture was filtered, and the resultant pigment press cake was re-slurried by using 250.0 parts of ion exchange water. After the completion of stirring, the slurry was dried by a spray dryer to produce a powdery pigment composition.

Figure 1:
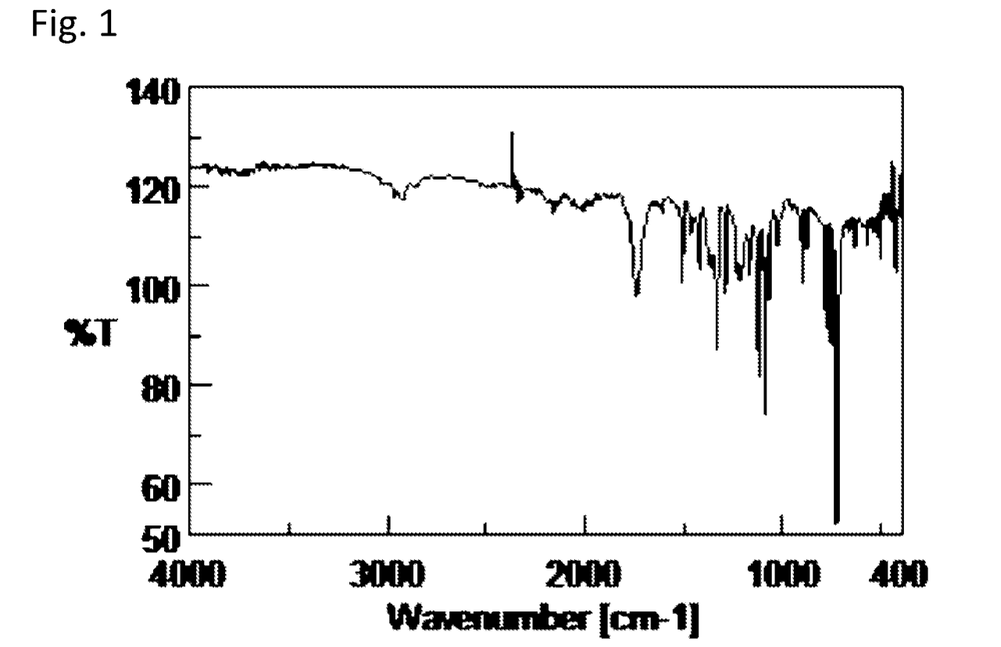
FIG. 1 is an IR chart of a pigment composition of Example 1.

FIG. 1 shows an IR chart of the resultant pigment composition.

Absorption of copper phthalocyanine sulfonic acid was found near 1030 $cm^{-1}$, and absorption of quaternary ammonium salt of copper phthalocyanine sulfonic acid was found near 3000 $cm^{-1}$.

The following items used in Example 1 are described below.

Regarding the rosin solution

A hydrogenated rosin solution was prepared by adding 15.0 parts of a 20.0% aqueous sodium hydroxide solution and 15.0 parts of hydrogenated rosin to 320.0 parts of water, and heating and stirring the resultant mixture.

Regarding the (1) copper phthalocyanine sulfonic acid solution

A solution of coper phthalocyanine sulfonic acid with an average number of substituents of 1.0 was prepared by adding 7.4 parts of a 20% aqueous sodium hydroxide solution and 8.3 parts of copper phthalocyanine sulfonic acid having an average number of substituents of 1.0 to 434.3 parts of water, and heating and stirring the resultant mixture.

Regarding the (2) copper phthalocyanine sulfonic acid solution

A solution of copper phthalocyanine sulfonic acid with an average number of substituents of 1.0 was prepared by adding 4.3 parts of a 20% aqueous sodium hydroxide solution and 9.0 parts of copper phthalocyanine sulfonic acid having an average number of substituents of 1.0 to 323.2 parts of water, and heating and stirring the resultant mixture.

Regarding the laurylamine (primary ammonium (monoalkyl)) acetic acid solution

A laurylamine solution was prepared by adding 22.0 parts of 99% acetic acid and 4.7 parts of laurylamine to 471.8 parts of water, and heating and stirring the resultant mixture.

Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 1.0 to 440.0 parts of water and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The mixture was adjusted to weak alkaline at pH 7 to 8 and filtered to produce a press cake of dimethyl dialkyl (C=18) ammonium salt of copper phthalocyanine sulfonic acid with an average number of substituents of 1.0. The press cake was dried and ground to produce a powdery quaternary dimethyl dialkyl (C=18) ammonium salt of copper phthalocyanine sulfonic acid with an average number of substituents of 1.0.

Example 2

(First step) A copper phthalocyanine crude manufactured by DIC Corporation was dry-ground by an attritor to produce a copper phthalocyanine ground product.

(Second step) To 200.0 parts of the copper phthalocyanine ground product, 330.0 parts of a rosin solution and 450.0 parts of (1) copper phthalocyanine sulfonic acid solution were added. Then, 220.0 parts of water was added to the resultant mixture and heated to 93° C. After the completion of heating, 15 parts of xylene was immediately added and stirred at 93° C. for 3 hours. After the completion of stirring, 336.5 parts of (2) copper phthalocyanine sulfonic acid solution was added and further stirred at 93° C. for 1 hour. After the completion of stirring, xylene was distilled off by heating to 100° C. After distillation off, water was added until the total amount was 4000.0 parts, and the resultant solution was adjusted to pH 3.9 by dropping a 9% aqueous acetic acid solution over 30 minutes. Then, 500.0 parts of a laurylamine (primary ammonium (monoalkyl)) acetic acid solution was added to the solution and stirred for 1 hour. Then, the resultant mixture was filtered, and the resultant pigment press cake was re-slurried by using 250.0 parts of ion exchange water. After the completion of stirring, the slurry was dried by a spray dryer to produce a powdery pigment composition. The total amount of the resultant powdery pigment composition was mixed with 7.3 parts of a powder of quaternary dimethyl dialkyl (C=18) ammonium salt of copper phthalocyanine sulfonic acid. As a result, a powdery pigment composition was produced.

The following items used in Example 2 are described below.

Regarding the rosin solution

A hydrogenated rosin solution was prepared by adding 15.0 parts of a 20.0% aqueous sodium hydroxide solution and 15.0 parts of hydrogenated rosin to 320.0 parts of water, and heating and stirring the resultant mixture.

Regarding the (1) copper phthalocyanine sulfonic acid solution

A solution of copper phthalocyanine sulfonic acid with an average number of substituents of 1.0 was prepared by adding 7.4 parts of a 20% aqueous sodium hydroxide solution and 8.3 parts of copper phthalocyanine sulfonic acid having an average number of substituents of 1.0 to 434.3 parts of water, and heating and stirring the resultant mixture.

Regarding the (2) copper phthalocyanine sulfonic acid solution

A solution of copper phthalocyanine sulfonic acid with an average number of substituents of 1.0 was prepared by adding 4.3 parts of a 20% aqueous sodium hydroxide solution and 9.0 parts of copper phthalocyanine sulfonic acid having an average number of substituents of 1.0 to 323.2 parts of water, and heating and stirring the resultant mixture.

Regarding the laurylamine (primary ammonium (monoalkyl)) acetic acid solution

A laurylamine solution was prepared by adding 22.0 parts of 99% acetic acid and 4.7 parts of laurylamine to 471.8 parts of water, and heating and stirring the resultant mixture.

Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 1.0 to 440.0 parts of water and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The mixture was adjusted to weak alkaline at pH 7 to 8 and filtered to produce a press cake of quaternary dimethyl dialkyl (C=18) ammonium salt of copper phthalocyanine sulfonic acid with an average number of substituents of 1.0. The press cake was dried and ground to produce a powdery quaternary dimethyl dialkyl (C=18) ammonium salt of copper phthalocyanine sulfonic acid with an average number of substituents of 1.0.

Example 3

(First step) A copper phthalocyanine crude manufactured by DIC Corporation was dry-ground by an attritor to produce a copper phthalocyanine ground product.

(Second step) To 200.0 parts of the copper phthalocyanine ground product, 330.0 parts of a rosin solution and 450.0 parts of (1) copper phthalocyanine sulfonic acid solution were added. Then, 220.0 parts of water was added to the resultant mixture and heated to 93° C. After the completion of heating, 15 parts of xylene was immediately added and stirred at 93° C. for 3 hours. After the completion of stirring, 336.5 parts of (2) copper phthalocyanine sulfonic acid solution was added and further stirred at 93° C. for 1 hour. After the completion of stirring, xylene was distilled off by heating to 100° C. After distillation off, water was added until the total amount was 4000.0 parts, and the resultant solution was adjusted to pH 3.9 by dropping a 9% aqueous acetic acid solution over 30 minutes. Then, 500.0 parts of a laurylamine (primary ammonium (monoalkyl)) acetic acid solution was added to the solution and stirred for 1 hour. Then, the resultant mixture was filtered, and the resultant pigment press cake was re-slurried by using 250.0 parts of ion exchange water. After the completion of stirring, the slurry was dried by a spray dryer to produce a powdery pigment composition. The total amount of the resultant powdery pigment composition was mixed with 4.8 parts of a powder of quaternary dimethyl dialkyl (C=18) ammonium salt of copper phthalocyanine sulfonic acid. As a result, a powdery pigment composition was produced.

The following items used in Example 3 are described below.

Regarding the rosin solution

A hydrogenated rosin solution was prepared by adding 15.0 parts of a 20.0% aqueous sodium hydroxide solution and 15.0 parts of hydrogenated rosin to 320.0 parts of water, and heating and stirring the resultant mixture.

Regarding the (1) copper phthalocyanine sulfonic acid solution

A solution of copper phthalocyanine sulfonic acid with an average number of substituents of 1.0 was prepared by adding 7.4 parts of a 20% aqueous sodium hydroxide solution and 8.3 parts of copper phthalocyanine sulfonic acid having an average number of substituents of 1.0 to 434.3 parts of water, and heating and stirring the resultant mixture.

Regarding the (2) copper phthalocyanine sulfonic acid solution

A solution of copper phthalocyanine sulfonic acid with an average number of substituents of 1.0 was prepared by adding 4.3 parts of a 20% aqueous sodium hydroxide solution and 9.0 parts of copper phthalocyanine sulfonic acid having an average number of substituents of 1.0 to 323.2 parts of water, and heating and stirring the resultant mixture.

Regarding the laurylamine (primary ammonium (monoalkyl)) acetic acid solution

A laurylamine solution was prepared by adding 22.0 parts of 99% acetic acid and 4.7 parts of laurylamine to 471.8 parts of water, and heating and stirring the resultant mixture.

Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 1.0 to 440.0 parts of water, and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The mixture was adjusted to weak alkaline at pH 7 to 8 and filtered to produce a press cake of quaternary dimethyl dialkyl (C=18) ammonium salt of copper phthalocyanine sulfonic acid with an average number of substituents of 1.0. The press cake was dried and ground to produce a powdery quaternary dimethyl dialkyl (C=18) ammonium salt of copper phthalocyanine sulfonic acid with an average number of substituents of 1.0.

Example 4

(First step) A copper phthalocyanine crude manufactured by DIC Corporation was dry-ground by an attritor to produce a copper phthalocyanine ground product.

(Second step) To 200.0 parts of the copper phthalocyanine ground product, 330.0 parts of a rosin solution and 450.0 parts of (1) copper phthalocyanine sulfonic acid solution were added. Then, 220.0 parts of water was added to the resultant mixture and heated to 93° C. After the completion of heating, 15 parts of xylene was immediately added and stirred at 93° C. for 3 hours. After the completion of stirring, 336.5 parts of (2) copper phthalocyanine sulfonic acid solution was added and further stirred at 93° C. for 1 hour. After the completion of stirring, xylene was distilled off by heating to 100° C. After distillation off, water was added until the total amount was 4000.0 parts, and the resultant solution was adjusted to pH 3.9 by dropping a 9% aqueous acetic acid solution over 30 minutes. Then, 500.0 parts of a laurylamine (primary ammonium (monoalkyl)) acetic acid solution was added to the solution and stirred for 1 hour. Then, the resultant mixture was filtered, and the resultant pigment press cake was re-slurried by using 250.0 parts of ion exchange water. After the completion of stirring, the slurry was dried by a spray dryer to produce a powdery pigment composition. The total amount of the resultant powdery pigment composition was mixed with 2.4 parts of a powder of quaternary dimethyl dialkyl (C=18) ammonium salt of copper phthalocyanine sulfonic acid. As a result, a powdery pigment composition was produced.

Figure 2:
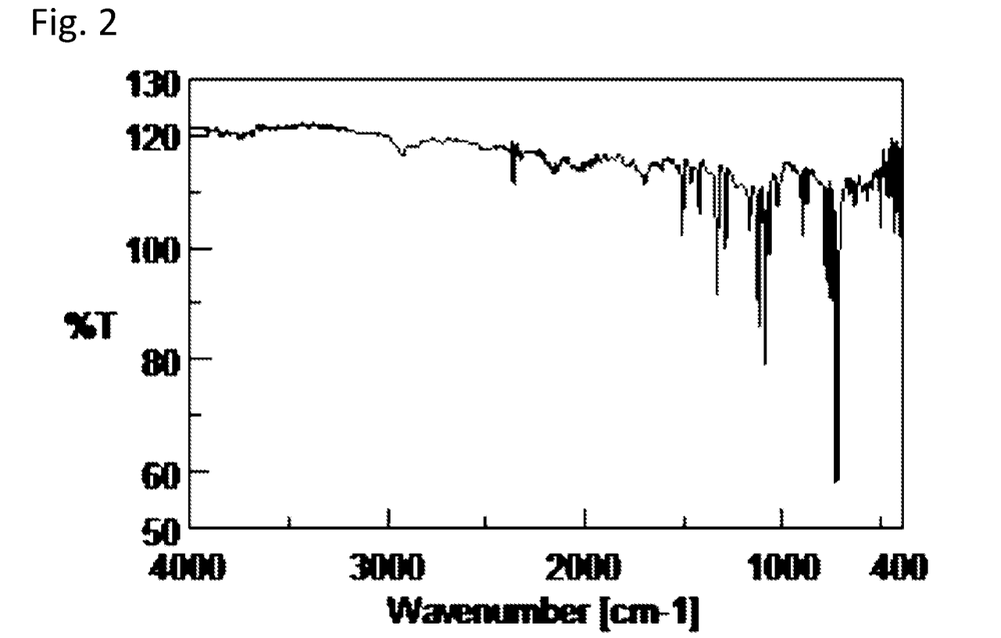
FIG. 2 is an IR chart of a pigment composition of Example 4.

FIG. 2 shows an IR chart of the resultant pigment composition.

Absorption of copper phthalocyanine sulfonic acid was found near 1030 $cm^{-1}$, and absorption of quaternary ammonium salt of copper phthalocyanine sulfonic acid was found near 3000 $cm^{-1}$.

The following items used in Example 4 are described below.

Regarding the rosin solution

A hydrogenated rosin solution was prepared by adding 15.0 parts of a 20.0% aqueous sodium hydroxide solution and 15.0 parts of hydrogenated rosin to 320.0 parts of water, and heating and stirring the resultant mixture.

Regarding the (1) copper phthalocyanine sulfonic acid solution

A solution of copper phthalocyanine sulfonic acid with an average number of substituents of 1.0 was prepared by adding 7.4 parts of a 20% aqueous sodium hydroxide solution and 8.3 parts of copper phthalocyanine sulfonic acid having an average number of substituents of 1.0 to 434.3 parts of water, and heating and stirring the mixture.

Regarding the (2) copper phthalocyanine sulfonic acid solution

A solution of copper phthalocyanine sulfonic acid with an average number of substituents of 1.0 was prepared by adding 4.3 parts of a 20% aqueous sodium hydroxide solution and 9.0 parts of copper phthalocyanine sulfonic acid having an average number of substituents of 1.0 to 323.2 parts of water, and heating and stirring the resultant mixture.

Regarding the laurylamine (primary ammonium (monoalkyl)) acetic acid solution

A laurylamine solution was prepared by adding 22.0 parts of 99% acetic acid and 4.7 parts of laurylamine to 471.8 parts of water, and heating and stirring the resultant mixture.

Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 1.0 to 440.0 parts of water, and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The resultant mixture was adjusted to weak alkaline at pH 7 to 8 and filtered to produce a press cake of quaternary dimethyl dialkyl (C=18) ammonium salt of copper phthalocyanine sulfonic acid with an average number of substituents of 1.0. The press cake was dried and ground to produce a powdery quaternary dimethyl dialkyl (C=18) ammonium salt of copper phthalocyanine sulfonic acid with an average number of substituents of 1.0.

Example 5

(First step) A copper phthalocyanine crude manufactured by DIC Corporation was dry-ground by an attritor to produce a copper phthalocyanine ground product.

(Second step) To 200.0 parts of the copper phthalocyanine ground product, 330.0 parts of a rosin solution and 450.0 parts of (1) copper phthalocyanine sulfonic acid solution were added. Then, 220.0 parts of water was added to the resultant mixture and heated to 93° C. After the completion of heating, 15 parts of xylene was immediately added and stirred at 93° C. for 3 hours. After the completion of stirring, 336.5 parts of (2) copper phthalocyanine sulfonic acid solution was added and further stirred at 93° C. for 1 hour. After the completion of stirring, xylene was distilled off by heating to 100° C. After distillation off, water was added until the total amount was 4000.0 parts, and the resultant solution was adjusted to pH 3.9 by dropping a 9% aqueous acetic acid solution over 30 minutes. Then, 500.0 parts of a laurylamine (primary ammonium (monoalkyl)) acetic acid solution was added to the solution and stirred for 1 hour. Then, the resultant mixture was filtered, and the resultant pigment press cake was re-slurried by using 250.0 parts of ion exchange water. After the completion of stirring, the slurry was dried by a spray dryer to produce a powdery pigment composition. The total amount of the resultant powdery pigment composition was mixed with 22.0 parts of a powder of quaternary dimethyl dialkyl (C=18) ammonium salt of copper phthalocyanine sulfonic acid. As a result, a powdery pigment composition was produced.

The following items used in Example 5 are described below.

Regarding the rosin solution

A hydrogenated rosin solution was prepared by adding 15.0 parts of a 20.0% aqueous sodium hydroxide solution and 15.0 parts of hydrogenated rosin to 320.0 parts of water, following by heating and stirring.

Regarding the (1) copper phthalocyanine sulfonic acid solution

A solution of copper phthalocyanine sulfonic acid with an average number of substituents of 1.0 was prepared by adding 7.4 parts of a 20% aqueous sodium hydroxide solution and 8.3 parts of copper phthalocyanine sulfonic acid having an average number of substituents of 1.0 to 434.3 parts of water, and heating and stirring the resultant mixture.

Regarding the (2) copper phthalocyanine sulfonic acid solution

A solution of copper phthalocyanine sulfonic acid with an average number of substituents of 1.0 was prepared by adding 4.3 parts of a 20% aqueous sodium hydroxide solution and 9.0 parts of copper phthalocyanine sulfonic acid having an average number of substituents of 1.0 to 323.2 parts of water, and heating and stirring the resultant mixture.

Regarding the laurylamine (primary ammonium (monoalkyl)) acetic acid solution

A laurylamine solution was prepared by adding 22.0 parts of 99% acetic acid and 4.7 parts of laurylamine to 471.8 parts of water, and heating and stirring the resultant mixture.

Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 1.0 to 440.0 parts of water, and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The mixture was adjusted to weak alkaline at pH 7 to 8 and filtered to produce a press cake of quaternary dimethyl dialkyl (C=18) ammonium salt of copper phthalocyanine sulfonic acid with an average number of substituents of 1.0. The press cake was dried and ground to produce a powdery quaternary dimethyl dialkyl (C=18) ammonium salt of copper phthalocyanine sulfonic acid with an average number of substituents of 1.0.

Example 6

(First step) A copper phthalocyanine crude manufactured by DIC Corporation was dry-ground by an attritor to produce a copper phthalocyanine ground product.

(Second step) To 200.0 parts of the copper phthalocyanine ground product, 330.0 parts of a rosin solution and 450.0 parts of (1) copper phthalocyanine sulfonic acid solution were added. Then, 220.0 parts of water was added to the resultant mixture and heated to 93° C. After the completion of heating, 15 parts of xylene was immediately added and stirred at 93° C. for 3 hours. After the completion of stirring, 336.5 parts of (2) copper phthalocyanine sulfonic acid solution was added and further stirred at 93° C. for 1 hour. After the completion of stirring, xylene was distilled off by heating to 100° C. After distillation off, water was added until the total amount was 4000.0 parts, and the resultant solution was adjusted to pH 3.9 by dropping a 9% aqueous acetic acid solution over 30 minutes. Then, 500.0 parts of a laurylamine (primary ammonium (monoalkyl)) acetic acid solution was added to the solution and stirred for 1 hour. Then, the resultant mixture was filtered, and the resultant pigment press cake was re-slurried by using 250.0 parts of ion exchange water. After the completion of stirring, the slurry was dried by a spray dryer to produce a powdery pigment composition. The total amount of the resultant powdery pigment composition was mixed with 29.4 parts of a powder of quaternary dimethyl dialkyl (C=18) ammonium salt of copper phthalocyanine sulfonic acid. As a result, a powdery pigment composition was produced.

The following items used in Example 6 are described below.

Regarding the rosin solution

A hydrogenated rosin solution was prepared by adding 15.0 parts of a 20.0% aqueous sodium hydroxide solution and 15.0 parts of hydrogenated rosin to 320.0 parts of water, following by heating and stirring.

Regarding the (1) copper phthalocyanine sulfonic acid solution

A solution of copper phthalocyanine sulfonic acid with an average number of substituents of 1.0 was prepared by adding 7.4 parts of a 20% aqueous sodium hydroxide solution and 8.3 parts of copper phthalocyanine sulfonic acid having an average number of substituents of 1.0 to 434.3 parts of water, and heating and stirring the resultant mixture.

Regarding the (2) copper phthalocyanine sulfonic acid solution

A solution of copper phthalocyanine sulfonic acid with an average number of substituents of 1.0 was prepared by adding 4.3 parts of a 20% aqueous sodium hydroxide solution and 9.0 parts of copper phthalocyanine sulfonic acid having an average number of substituents of 1.0 to 323.2 parts of water, and heating and stirring the resultant mixture.

Regarding the laurylamine (primary ammonium (monoalkyl)) acetic acid solution

A laurylamine solution was prepared by adding 22.0 parts of 99% acetic acid and 4.7 parts of laurylamine to 471.8 parts of water, and heating and stirring the resultant mixture.

Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 1.0 to 440.0 parts of water, and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The mixture was adjusted to weak alkaline at pH 7 to 8 and filtered to produce a press cake of quaternary dimethyl dialkyl (C=18) ammonium salt of copper phthalocyanine sulfonic acid with an average number of substituents of 1.0. The press cake was dried and ground to produce a powdery quaternary dimethyl dialkyl (C=18) ammonium salt of copper phthalocyanine sulfonic acid with an average number of substituents of 1.0.

Example 7

(First step) A copper phthalocyanine crude manufactured by DIC Corporation was dry-ground by an attritor to produce a copper phthalocyanine ground product.

(Second step) To 200.0 parts of the copper phthalocyanine ground product, 330.0 parts of a rosin solution and 450.0 parts of (1) copper phthalocyanine sulfonic acid solution were added. Then, 220.0 parts of water was added to the resultant mixture and heated to 93° C. After the completion of heating, 15 parts of xylene was immediately added and stirred at 93° C. for 3 hours. After the completion of stirring, 336.5 parts of (2) copper phthalocyanine sulfonic acid solution was added and further stirred at 93° C. for 1 hour. After the completion of stirring, xylene was distilled off by heating to 100° C. After distillation off, water was added until the total amount was 4000.0 parts, and the resultant solution was adjusted to pH 3.9 by dropping a 9% aqueous acetic acid solution over 30 minutes. Then, 500.0 parts of a laurylamine (primary ammonium (monoalkyl)) acetic acid solution was added to the solution and stirred for 1 hour. Then, 7.3 parts of a powder of quaternary dimethyl dialkyl (C=18) ammonium salt of copper phthalocyanine sulfonic acid was added to the resultant mixture and further stirred for 30 minutes. Then, the resultant mixture was filtered, and the resultant pigment press cake was re-slurried by using 250.0 parts of ion exchange water. After the completion of stirring, the slurry was dried by a spray dryer to produce a powdery pigment composition.

The following items used in Example 7 are described below.

Regarding the rosin solution

A hydrogenated rosin solution was prepared by adding 15.0 parts of a 20.0% aqueous sodium hydroxide solution and 15.0 parts of hydrogenated rosin to 320.0 parts of water, following by heating and stirring.

Regarding the (1) copper phthalocyanine sulfonic acid solution

A solution of copper phthalocyanine sulfonic acid with an average number of substituents of 0.8 was prepared by adding 7.4 parts of a 20% aqueous sodium hydroxide solution and 8.3 parts of copper phthalocyanine sulfonic acid having an average number of substituents of 0.8 to 434.3 parts of water, and heating and stirring the resultant mixture.

Regarding the (2) copper phthalocyanine sulfonic acid solution

A solution of copper phthalocyanine sulfonic acid with an average number of substituents of 0.8 was prepared by adding 4.3 parts of a 20% aqueous sodium hydroxide solution and 9.0 parts of copper phthalocyanine sulfonic acid having an average number of substituents of 0.8 to 323.2 parts of water, and heating and stirring the resultant mixture.

Regarding the laurylamine (primary ammonium (monoalkyl)) acetic acid solution

A laurylamine solution was prepared by adding 22.0 parts of 99% acetic acid and 4.7 parts of laurylamine to 471.8 parts of water, and heating and stirring the resultant mixture.

Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 0.8 to 440.0 parts of water, and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The mixture was adjusted to weak alkaline at pH 7 to 8 and filtered to produce a press cake of quaternary dimethyl dialkyl (C=18) ammonium salt of copper phthalocyanine sulfonic acid with an average number of substituents of 0.8. The press cake was dried and ground to produce a powdery quaternary dimethyl dialkyl (C=18) ammonium salt of copper phthalocyanine sulfonic acid with an average number of substituents of 0.8.

Comparative Example 1

(First step) A copper phthalocyanine crude manufactured by DIC Corporation was dry-ground by an attritor to produce a copper phthalocyanine ground product.

(Second step) To 200.0 parts of the copper phthalocyanine ground product, 330.0 parts of a rosin solution and 450.0 parts of (1) copper phthalocyanine sulfonic acid solution were added. Then, 220.0 parts of water was added to the resultant mixture and heated to 93° C. After the completion of heating, 15 parts of xylene was immediately added and stirred at 93° C. for 3 hours. After the completion of stirring, 336.5 parts of (2) copper phthalocyanine sulfonic acid solution was added and further stirred at 93° C. for 1 hour. After the completion of stirring, xylene was distilled off by heating to 100° C. After distillation off, water was added until the total amount was 4000.0 parts, and the resultant solution was adjusted to pH 3.9 by dropping a 9% aqueous acetic acid solution over 30 minutes. Then, 500.0 parts of a laurylamine (primary ammonium (monoalkyl)) acetic acid solution was added to the solution and stirred for 1 hour. Then, the resultant mixture was filtered, and the resultant pigment press cake was re-slurried by using 250.0 parts of ion exchange water. After the completion of stirring, the slurry was dried by a spray dryer to produce a powdery pigment composition.

Figure 3:
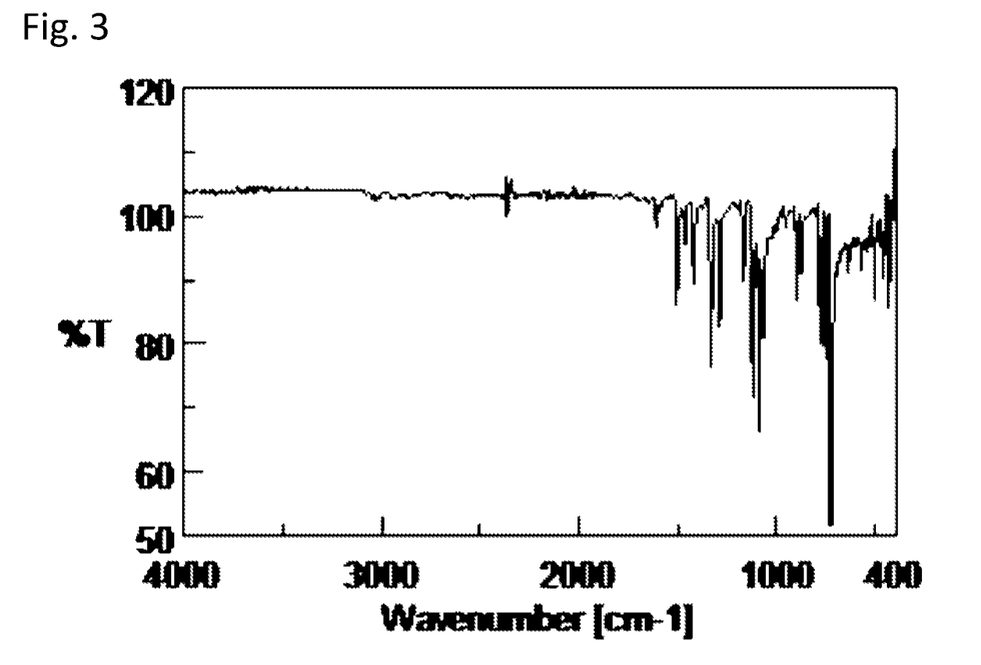
FIG. 3 is an IR chart of a pigment composition of Comparative Example 1.

FIG. 3 shows an IR chart of the resultant pigment composition.

Absorption of copper phthalocyanine sulfonic acid was found near 1030 cm-1.

The following items used in Comparative Example 1 are described below.

Regarding the rosin solution

A hydrogenated rosin solution was prepared by adding 15.0 parts of a 20.0% aqueous sodium hydroxide solution and 15.0 parts of hydrogenated rosin to 320.0 parts of water, following by heating and stirring.

Regarding the (1) copper phthalocyanine sulfonic acid solution

A solution of copper phthalocyanine sulfonic acid with an average number of substituents of 1.0 was prepared by adding 7.4 parts of a 20% aqueous sodium hydroxide solution and 8.3 parts of copper phthalocyanine sulfonic acid having an average number of substituents of 1.0 to 434.3 parts of water, and heating and stirring the resultant mixture.

Regarding the (2) copper phthalocyanine sulfonic acid solution

A solution of copper phthalocyanine sulfonic acid with an average number of substituents of 1.0 was prepared by adding 4.3 parts of a 20% aqueous sodium hydroxide solution and 9.0 parts of copper phthalocyanine sulfonic acid having an average number of substituents of 1.0 to 323.2 parts of water, and heating and stirring the resultant mixture.

Regarding the laurylamine (primary ammonium (monoalkyl)) acetic acid solution

A laurylamine solution was prepared by adding 22.0 parts of 99% acetic acid and 4.7 parts of laurylamine to 471.8 parts of water, and heating and stirring the resultant mixture.

Comparative Example 2

(First step) A copper phthalocyanine crude manufactured by DIC Corporation was dry-ground by an attritor to produce a copper phthalocyanine ground product.

(Second step) To 200.0 parts of the copper phthalocyanine ground product, 330.0 parts of a rosin solution and 450.0 parts of (1) copper phthalocyanine sulfonic acid solution were added. Then, 220.0 parts of water was added to the resultant mixture and heated to 93° C. After the completion of heating, 15 parts of xylene was immediately added and stirred at 93° C. for 3 hours. After the completion of stirring, 336.5 parts of (2) copper phthalocyanine sulfonic acid solution was added and further stirred at 93° C. for 1 hour. After the completion of stirring, xylene was distilled off by heating to 100° C. After distillation off, water was added until the total amount was 4000.0 parts, and the resultant solution was adjusted to pH 3.9 by dropping a 9% aqueous acetic acid solution over 30 minutes. Then, 500.0 parts of a dimethyl dialkyl (C=18) acetic acid solution was added to the solution and stirred for 1 hour. Then, the resultant mixture was filtered, and the resultant pigment press cake was re-slurried by using 250.0 parts of ion exchange water.

After the completion of stirring, the slurry was dried by a spray dryer to produce a powdery pigment composition.

The following items used in Comparative Example 2 are described below.

Regarding the rosin solution

A hydrogenated rosin solution was prepared by adding 15.0 parts of a 20.0% aqueous sodium hydroxide solution and 15.0 parts of hydrogenated rosin to 320.0 parts of water, following by heating and stirring.

Regarding the (1) copper phthalocyanine sulfonic acid solution

A solution of copper phthalocyanine sulfonic acid with an average number of substituents of 1.0 was prepared by adding 7.4 parts of a 20% aqueous sodium hydroxide solution and 8.3 parts of copper phthalocyanine sulfonic acid having an average number of substituents of 1.0 to 434.3 parts of water, and heating and stirring the resultant mixture.

Regarding the (2) copper phthalocyanine sulfonic acid solution

A solution of copper phthalocyanine sulfonic acid with an average number of substituents of 1.0 was prepared by adding 4.3 parts of a 20% aqueous sodium hydroxide solution and 9.0 parts of copper phthalocyanine sulfonic acid having an average number of substituents of 1.0 to 323.2 parts of water, and heating and stirring the resultant mixture.

Regarding the dimethyl dialkyl (C=18) acetic acid solution

A solution of dimethyl dialkyl (C=118) ammonium chloride, prepared by adding 22.0 parts of 99% acetic acid and 13.0 parts (9.8 parts as quaternary ammonium) of dimethyl dialkyl (C=18) ammonium chloride to 465.0 parts of water, and heating and stirring the resultant mixture.

Comparative Example 3

A copper phthalocyanine crude manufactured by DIC Corporation was dry-ground by an attritor to produce a copper phthalocyanine ground product. To 1350 parts of the copper phthalocyanine ground product, 3960 parts of isobutanol and 8040 parts of water were added. The resultant mixture was heated to 89° C. and refluxed for 1 hour to form a pigment, and then isobutanol was distilled off. Then, water was added until the total amount was 12000 parts. The resultant solution was dried by a spray dryer to produce a powder pigment. Then, 100.0 parts of the resultant copper phthalocyanine powder pigment was mixed with 13.0 parts of a powder of quaternary dimethyl dialkyl (C=18) ammonium salt of copper phthalocyanine sulfonic acid. As a result, a powdery pigment composition was produced.

The following item used in Comparative Example 3 is described below.

Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 1.0 to 440.0 parts of water, and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The resultant mixture was adjusted to weak alkaline at pH 7 to 8 and filtered to produce a press cake of quaternary dimethyl dialkyl (C=18) ammonium salt of copper phthalocyanine sulfonic acid with an average number of substituents of 1.0. The press cake was dried and ground to produce a powdery quaternary dimethyl dialkyl (C=18) ammonium salt of copper phthalocyanine sulfonic acid with an average number of substituents of 1.0.

Comparative Example 4

A copper phthalocyanine crude manufactured by DIC Corporation was dry-ground by an attritor to produce a copper phthalocyanine ground product. To 1350 parts of the copper phthalocyanine ground product, 3960 parts of isobutanol and 8040 parts of water were added. The resultant mixture was heated to 89° C. and refluxed for 1 hour to form a pigment, and then isobutanol was distilled off. Then, water was added until the total amount was 12000 parts. The resultant solution was dried by a spray dryer to produce a powder pigment. Then, 100.0 parts of the resultant copper phthalocyanine powder pigment was mixed with 6.5 parts of a powder of quaternary dimethyl dialkyl (C=18) ammonium salt of copper phthalocyanine sulfonic acid. As a result, a powdery pigment composition was produced.

The following item used in Comparative Example 4 is described below.

Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 1.0 to 440.0 parts of water, and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The mixture was adjusted to weak alkaline at pH 7 to 8 and filtered to produce a press cake of quaternary dimethyl dialkyl (C=18) ammonium salt of copper phthalocyanine sulfonic acid with an average number of substituents of 1.0. The press cake was dried and ground to produce a powdery quaternary dimethyl dialkyl (C=18) ammonium salt of copper phthalocyanine sulfonic acid with an average number of substituents of 1.0.

Comparative Example 5

A copper phthalocyanine crude manufactured by DIC Corporation was dry-ground by an attritor to produce a copper phthalocyanine ground product. To 1350 parts of the copper phthalocyanine ground product, 3960 parts of isobutanol and 8040 parts of water were added. The resultant mixture was heated to 89° C. and refluxed for 1 hour to form a pigment, and then isobutanol was distilled off. Then, water was added until the total amount was 12000 parts. The resultant solution was dried by a spray dryer to produce a powder pigment. Then, 100.0 parts of the resultant copper phthalocyanine powder pigment was mixed with 11.0 parts of a powder of quaternary dimethyl dialkyl (C=18) ammonium salt of copper phthalocyanine sulfonic acid. As a result, a powdery pigment composition was produced.

The following item used in Comparative Example 5 is described below.

Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 1.0 to 440.0 parts of water, and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The mixture was adjusted to weak alkaline at pH 7 to 8 and filtered to produce a press cake of quaternary dimethyl dialkyl (C=18) ammonium salt of copper phthalocyanine sulfonic acid with an average number of substituents of 1.0. The press cake was dried and ground to produce a powdery quaternary dimethyl dialkyl (C=18) ammonium salt of copper phthalocyanine sulfonic acid with an average number of substituents of 1.0.

Comparative Example 6

A copper phthalocyanine crude manufactured by DIC Corporation was dry-ground by an attritor to produce a copper phthalocyanine ground product. To 1350 parts of the copper phthalocyanine ground product, 3960 parts of isobutanol and 8040 parts of water were added. The resultant mixture was heated to 89° C. and refluxed for 1 hour to form a pigment, and then isobutanol was distilled off. Then, water was added until the total amount was 12000 parts. The resultant solution was dried by a spray dryer to produce a powder pigment. Then, 100.0 parts of the resultant copper phthalocyanine powder pigment was mixed with 17.0 parts of a powder of quaternary dimethyl dialkyl (C=18) ammonium salt of copper phthalocyanine sulfonic acid. As a result, a powdery pigment composition was produced.

The following item used in Comparative Example 6 is described below.
Method for forming a powder of quaternary dimethyl dialkyl (C=18) salt of copper phthalocyanine sulfonic acid A solution was prepared by adding 3.6 parts of a 20% aqueous sodium hydroxide solution and 17.3 parts of copper phthalocyanine sulfonic acid with an average number of substituents of 1.0 to 440.0 parts of water, and heating and stirring the resultant mixture. To the resultant solution, was added dropwise a solution prepared by adding 22.0 parts of 99% acetic acid and 27.5 parts of dimethyl dialkyl (C=18) ammonium chloride to 471.8 parts of water, and heating and stirring the resultant mixture. The mixture was adjusted to weak alkaline at pH 7 to 8 and filtered to produce a press cake of quaternary dimethyl dialkyl (C=18) ammonium salt of copper phthalocyanine sulfonic acid with an average number of substituents of 1.0. The press cake was dried and ground to produce a powdery quaternary dimethyl dialkyl (C=18) ammonium salt of copper phthalocyanine sulfonic acid with an average number of substituents of 1.0.

Comparative Example 7

A copper phthalocyanine crude manufactured by DIC Corporation was dry-ground by an attritor to produce a copper phthalocyanine ground product. To 1350 parts of the copper phthalocyanine ground product, 3960 parts of isobutanol and 8040 parts of water were added. The resultant mixture was heated to 89° C. and refluxed for 1 hour to form a pigment, and then isobutanol was distilled off. Then, water was added until the total amount was 12000 parts. The resultant solution was dried by a spray dryer to produce a powder pigment.

Figure 4:
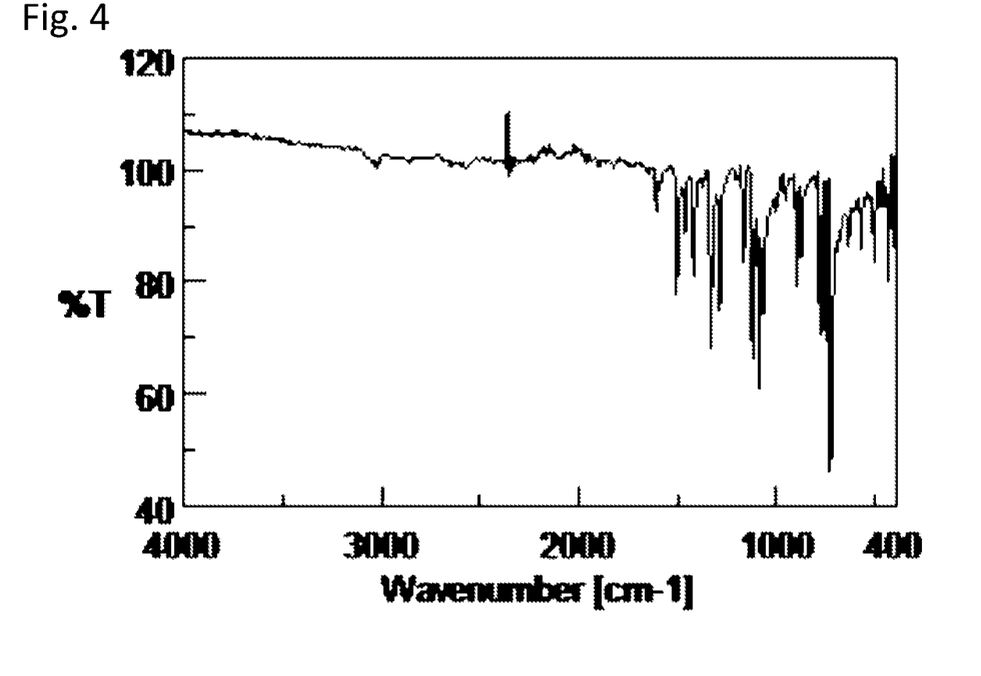
FIG. 4 is an IR chart of a pigment composition of Comparative Example 7.

FIG. 4 shows an IR chart of the resultant pigment composition.

The IR chart shows the untreated copper phthalocyanine pigment.

Ink Forming Method
(1) Formation of Evaluation Ink

In a 200 mL glass bottle, 17.3 parts of a pigment, 8.9 parts of a NC resin, 48.7 parts of 1-ethoxy-2-propanol (manufactured by Kanto Chemical Co., Inc.), 8.0 parts of n-propyl alcohol (manufactured by Kanto Chemical Co., Inc.), 11.0 parts of ethanol (manufactured by Kanto Chemical Co., Inc.), 6.1 parts of ethyl acetate (manufactured by Kanto Chemical Co., Inc.), and 150 parts of SAZ beads (zirconia YTZ ball 1.25ϕ manufactured by Tokyo Garasu Kikai Co., Ltd.) were placed and dispersed for 2 hours by Shaker Skandex SK550 (manufactured by Fast & Fluid Management B. V. Company), forming an ink for evaluation.

(2) Adjustment of Ink Viscosity

The viscosity was adjusted by adding ethanol (manufactured by Kanto Chemical Co., Inc.) according to demand. The viscosity was adjusted so as to completely fall down within 23 seconds by using Zahn cup No. 2 (manufactured by Meisei Co., Ltd.).

(3) Hue Evaluation Method

The ink with the viscosity adjusted in (2) was spread on spread paper or acetate film by using bar coater No. 2 (manufactured by RK Print Coat Instruments Ltd.), and the hue was determined by visual observation.

(4) Viscosity Evaluation Method

The viscosity was measured at 6 to 120 RPM by using a viscometer (model: DV3TRVTJO) manufactured by Brookfield, Inc.

(5) Resolubility Test Method

The ink prepared in (2) was spread on a plate for evaluating resolubility (the name and maker unknown). Then, the ink was dried by a dryer for 1 minute. Then, the plate for evaluating resolubility was stood vertically, and ethanol (manufactured by Kanto Chemical Co., Inc.) was poured and flowed on the dry ink from above. When the dry ink was flowed down, resolubility was determined as "good (A)", and when the dry ink was not flowed down, resolubility was determined as "poor (B)". When determination could not be made by the ink alone, the ink was spread in parallel with a target ink, and determination of superiority/inferiority was made by comparison.

TABLE 1

|  | Viscosity | Resolubility | Hue |
| --- | --- | --- | --- |
| Example 1 | A | A | A |
| Example 2 | A | A | A |
| Example 3 | A | A | A |
| Example 4 | A | A | A |
| Example 5 | B | A | B |
| Example 6 | B | A | B |
| Example 7 | A | A | A |
| Comparative Example 1 | A | B | B |
| Comparative Example 2 | C | A | B |
| Comparative Example 3 | D | A | B |
| Comparative Example 4 | D | B | B |
| Comparative Example 5 | D | A | B |
| Comparative Example 6 | D | A | B |
| Comparative Example 7 | D | B | C |

Evaluation of Glycol Ether-Based Ink
<Viscosity>
A: The measured viscosity was 1500 mPa·s or less and was good.
B: The measured viscosity was 1500 to 2000 mPa·s and was good.

C: The measured viscosity was 2000 to 3000 mPa·s or more and was poor.

D: The measured viscosity was 3000 mPa·s or more and was unusable.

<Resolubility>

A: The total amount of ink was flowed down, exhibiting good resolubility.

B: The ink was not flowed down, exhibiting poor resolubility.

<Hue>

A: Color development and transparency were determined to be good by visual observation.

B: Color development and transparency were determined to be within a range of use by visual observation.

C: Color development and transparency were determined to be poor/unusable by visual observation.

Comparison of Examples 1 to 7 with Comparative Examples 1 to 7 indicates that in order to obtain the good results about the viscosity as an index of ink characteristics, resolubility as an index of printability, and hue, it is necessary to contain all the derivatives of the general formula (I), the general formula (II), and the general formula (III).

The invention claimed is:

1. A copper phthalocyanine pigment composition comprising:
   a copper phthalocyanine pigment;
   a copper phthalocyanine sulfonic acid derivative represented by general formula (I),

General Formula (I)

[in the formula, n represents an average number of substituents of 0.5 to 1.5];
   a copper phthalocyanine derivative represented by general formula (II), General Formula (II)

[in the formula, $R^1$ represents a $C_1$-$C_{20}$ alkyl group, and n represents an average number of substituents of 0.5 to 1.5]; and
   a copper phthalocyanine derivative represented by general formula (III), General Formula (III)

[in the formula, $R^2$, $R^3$, $R^4$, and $R^5$ each independently represent a $C_1$-$C_{20}$ alkyl group, at least one of $R^2$, $R^3$, $R^4$, and $R^5$ is a $C_6$-$C_{2G}$ alkyl group, and n represents an average number of substituents of 0.5 to 1.5],
   wherein the content of the copper phthalocyanine sulfonic acid derivative represented by the general formula (I) is 2% by mass or more and 4% by mass or less in the entire pigment composition, the content of the copper phthalocyanine derivative represented by the general formula (II) is 5% by mass or more and 6% by mass or less in the entire pigment composition, and the content of the copper phthalocyanine derivative represented by the general formula (III) is 0.5% by mass or more and 5% by mass or less in the entire pigment composition.

2. An ink composition comprising the copper phthalocyanine pigment composition according to claim 1, a nitrocellulose resin, and a glycol ether-based solvent.

* * * * *